United States Patent [19]

Carroll

[11] Patent Number: 5,443,023

[45] Date of Patent: Aug. 22, 1995

[54] SEED FURROW CLOSING APPARATUS FOR AGRICULTURAL PLANTERS

[76] Inventor: Walter R. Carroll, HCR Box 84A, Lytle, Tex. 78052

[21] Appl. No.: 33,272

[22] Filed: Mar. 15, 1993

[51] Int. Cl.$^6$ .................................................. A01C 5/06
[52] U.S. Cl. .................................. 111/191; 111/144; 172/557
[58] Field of Search ............... 111/139, 141, 193, 195, 111/190, 191, 144, 159; 172/557, 540

[56] References Cited

U.S. PATENT DOCUMENTS

| | | |
|---|---|---|
| 22,676 | 1/1859 | Seaman . |
| 375,741 | 1/1888 | Gilmore et al. ................ 111/139 |
| 489,037 | 1/1893 | Roadhouse . |
| 1,847,327 | 3/1932 | Bateman ...................... 111/144 |
| 2,924,189 | 9/1955 | McLeod . |
| 3,151,683 | 10/1964 | Steck ........................... 172/177 |
| 3,742,877 | 7/1973 | Coffee ......................... 111/191 |
| 4,009,668 | 3/1977 | Brass et al. .................... 111/195 |
| 4,033,270 | 7/1977 | Bezzerides et al. .............. 172/540 |
| 4,055,126 | 10/1977 | Brown et al. ................... 172/540 |
| 4,391,335 | 7/1983 | Birkenbach .................... 172/540 |
| 4,785,890 | 11/1988 | Martin ......................... 172/540 |
| 5,267,517 | 12/1993 | Jones .......................... 172/540 |

FOREIGN PATENT DOCUMENTS 3743032  6/1989  Germany ......................... 111/191

*Primary Examiner*—Randolph A. Reese
*Assistant Examiner*—Spencer Warnick
*Attorney, Agent, or Firm*—Gunn, Lee & Miller

[57] ABSTRACT

A furrow closing apparatus for an agricultural planter producing an open seed furrow in the soil into which seeds are sequentially deposited, comprising a pair of rotary forks mountable on the planter on opposite sides of the open seed furrow and at a location rearwardly of the seed depositing mechanism; each rotary fork having a hub portion for rotational mounting on the planter and a plurality of radially projecting rigid tines rigidly secured to the hub portion; said tines having an arcuate configuration in a radial direction thereby producing a convex soil engaging surface which imparts a compressing action to the soil adjacent the sidewall of the open seed trench to fragmentize both sidewalls and an adjacent strip to cover the deposited seed with the fragmentized soil particles.

6 Claims, 3 Drawing Sheets

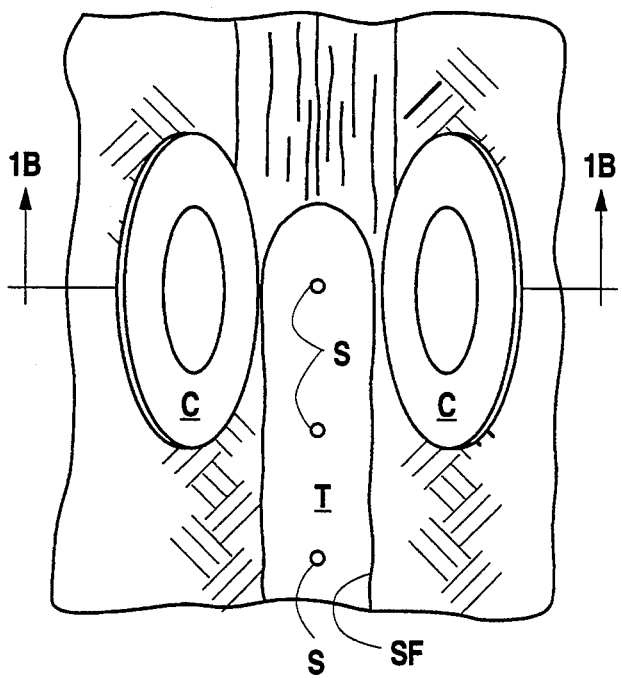
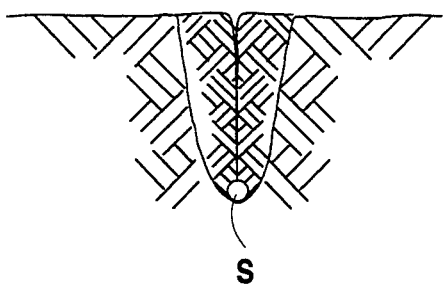
Fig. 1A    Fig. 1B
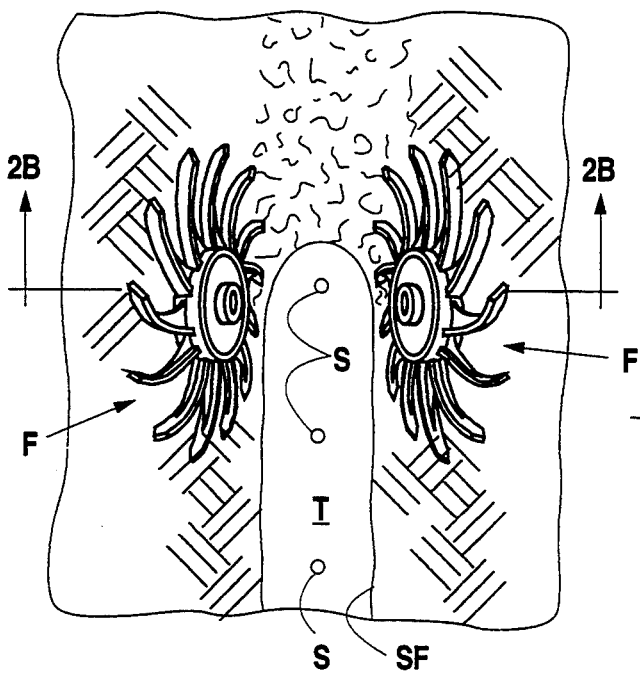
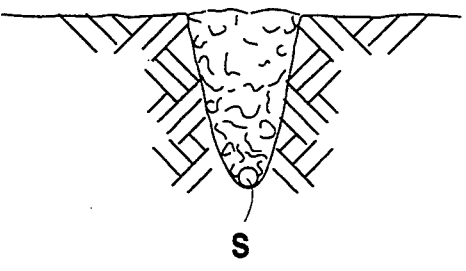
Fig. 2A    Fig. 2B

SEED FURROW CLOSING APPARATUS FOR AGRICULTURAL PLANTERS

BACKGROUND OF THE INVENTION

1. Field of the Invention

The invention relates to an improved apparatus for effecting the closing of an open seed furrow produced in soil by a tractor drawn planter which sequentially deposits seed into the open furrow as it is produced by the forward movement of the planter, and particularly to an apparatus capable of reliable closing of seed furrows produced in soil which has not received any cultivation subsequent to the harvesting of the previous crop.

2. Summary of the Prior Art

One of man's earliest occupations was the planting of seeds in the soil. With the advent of horse drawn tools, the 19th century saw the development of horse pulled planting units which incorporated a furrow opening device, a seed depositing mechanism operated manually or by ground engaging wheels to sequentially deposit seed in the open furrow, and followed by an apparatus for moving soil into the open furrow to cover the seed. See for example, U.S. Pat. Nos. 22,676 to Seaman and 489,037 to Roadhouse.

In each of these very early patents, the filling of the open top furrow was accomplished by a pair of disc-shaped wheels having a plurality of relatively short radial projections spaced around the peripheries of the disc-shaped wheels. Such projections were pointed and entered the ground a limited distance to rotate the wheels by the forward movement of the horse pulled planter, but also to throw dirt particles upwardly and rearwardly into the open furrow. For these prior art devices to be successful, the soil bed had to be well prepared in advance of planting. Leftover stubble and stalks from the previous crop would, when encountered by the disc-shaped wheels, raise such wheels and defeat the dirt throwing action, thus leaving a portion of the furrow uncovered and preventing the germination of the seeds in such portion.

In the intervening years, many other furrow closing apparatuses have been tried, such as scrapers or curved discs disposed on opposite sides of the open furrow and operating to laterally displace two bands of soil and move same into the seed furrow. (See FIGS. 1a and 1b for a schematic showing of such prior art furrow closing apparatus.) Again, these mechanisms functioned well in well prepared soil beds, but if stubble or trash was on the field, or the soil comprised a large percentage of clay, the furrow closing operation was less than desirable. Trash or stubble would effect an undesired elevation of the furrow closing apparatus. When operating in clay soils, not only would the furrow wall be compacted by its formation, but the two clay strips cut by the discs would be compacted together to form an unpenetrable barrier above the germinating seed.

In recent years a new approach to farming in arid areas of the country has been successfully introduced. Instead of plowing the field to bury the stubble and trash from the previous crop, the new approach is to plant the field without soil preparation, hence with the stubble and trash from the previous crop on the surface. The presence of such trash on the surface substantially diminished the loss of water from the soil and, where irrigation is employed, substantially reduced the amount and frequency of water application.

A popular planter utilized in such areas is Model No. 7100, manufactured and sold by John Deere Co. of Moline, Ill. This planter provides a rearwardly projecting subframe pivotally mounted to the planter frame for movements in a vertical plane. An adjustable tension spring urges the subframe toward the ground. A pair of discs called coulters are rotatably mounted on the subframe and are gravity and spring biased into respective engagement with opposite sides of the seed trench or furrow. The coulters are provided with notches in the sharpened periphery of the discs and such notches are supposed to facilitate the cutting of trash by the coulters. See U.S. Pat. No. 2,924,189 to Macleod.

Despite the provision of notches in the cutting periphery of the coulters, it has been observed that corn stubble will still cause undesired elevation of the coulters, hence leaving open spots in the seed furrow. More importantly, when used in clay soils, the coulters produce a compacting of the two strips cut along the sidewalls of the furrow to form a solid barrier to plant growth from the deposited seeds in the covered furrow.

In light soils, such coulters move too much soil forming a ridge over the deposited seed.

From the foregoing discussion, it is readily apparent that an improved covering apparatus for seed furrows is highly desired by a major segment of the crop farming industry.

SUMMARY OF THE INVENTION

The present invention provides an economical, yet highly effective solution to the problem of achieving seed furrow closing in fields that are replanted without removal or burying of stubble and trash remaining after the harvesting of the previous crop. Assuming that an existing planter, such as the above referred to John Deere Model 7100, has a rearwardly projecting, vertically pivotable subframe secured to the planter behind each seed depositing tube and spring biased downwardly, a pair of rotary forks are pivotally mounted on the subframe for rotation about two axes lying in the same vertical plane, but oppositely inclined relative two each other. Each rotary fork has a central hub portion and a plurality of peripherally spaced, radially projecting, rigid tines, the free ends of which are engagable with the ground as the planter is pulled or carried thereover by a tractor due to the weight of the subframe and rotary forks and the downward spring tension thereon.

The positions of the bearing hubs for the rotary forks is selected so that the tines thereof respectively engage the ground adjacent each side of the open seed furrow or trench.

The tines of each rotary fork lie in the same plane perpendicular to the axis of rotation of the bearing hubs. Each tine is arcuately curved in a radial direction to define a convex surface which contacts and enters the ground surface as the planter moves. The width of the convex surface of each tine is essentially flat, so that the tine exerts a substantial compression force on the soil as it engages and passes through the soil adjacent to the side wall of the open seed trench. This action results in a fragmentation of the side wall and the adjacent soil, and the soil particles fall into the open trench to cover the seed deposited therein without forming a compact wall over the seed if the soil contains a substantial amount of clay.

The aforedescribed rotary forks greatly improve the reliability of the furrow covering operation. The angular separation of the free ends of the tines permits the tines to straddle or slide downwardly along stubble, reducing the possibility of elevation of the rotary forks by any such stubble in the path of the rotating tines If loose trash is engaged by a tine and moved by it through the soil, the trash will be discarded from such tine upon rotating upwardly out of the soil due to the fact that the convex surface engaging the trash will inherently slide from under the trash as the rotary fork moves forwardly.

Further advantages of this invention will be readily apparent to those skilled in the art from the following detailed description, taken in conjunction with the annexed sheets of drawings, of a preferred embodiment of this invention.

BRIEF DESCRIPTION OF DRAWINGS

FIG. 1A is a schematic top view of a prior art planter and seed furrow covering apparatus.

FIG. 1B is a sectional view taken on the plane B—B of FIG. 1A.

FIG. 2A is a schematic top view of a planter incorporating a seed furrow covering apparatus embodying this invention.

FIG. 2B is a sectional view taken on the plane B—B of FIG. 2.

DESCRIPTION OF PREFERRED EMBODIMENT

Figure 4:
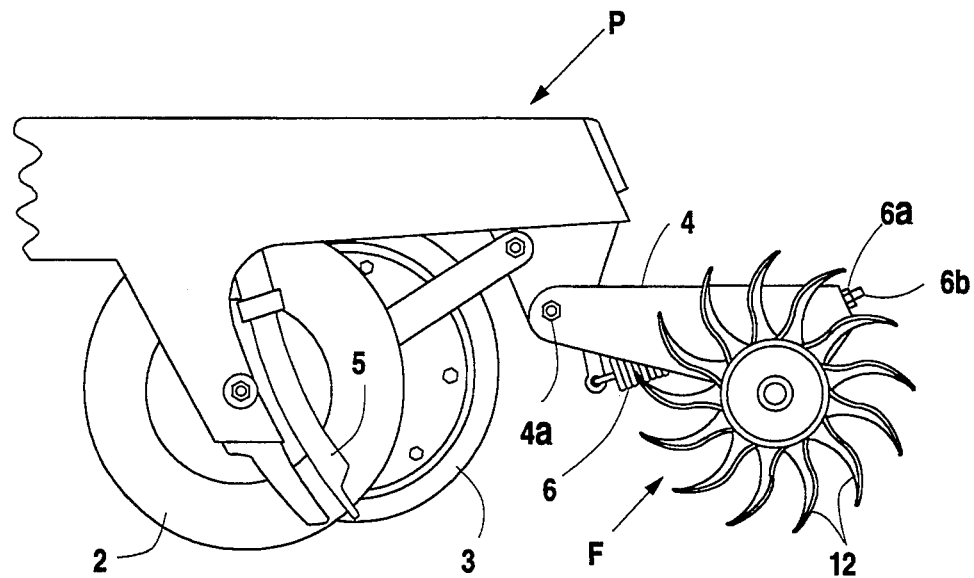
FIG. 4 is a perspective view of FIG. 3.
Figure 3:
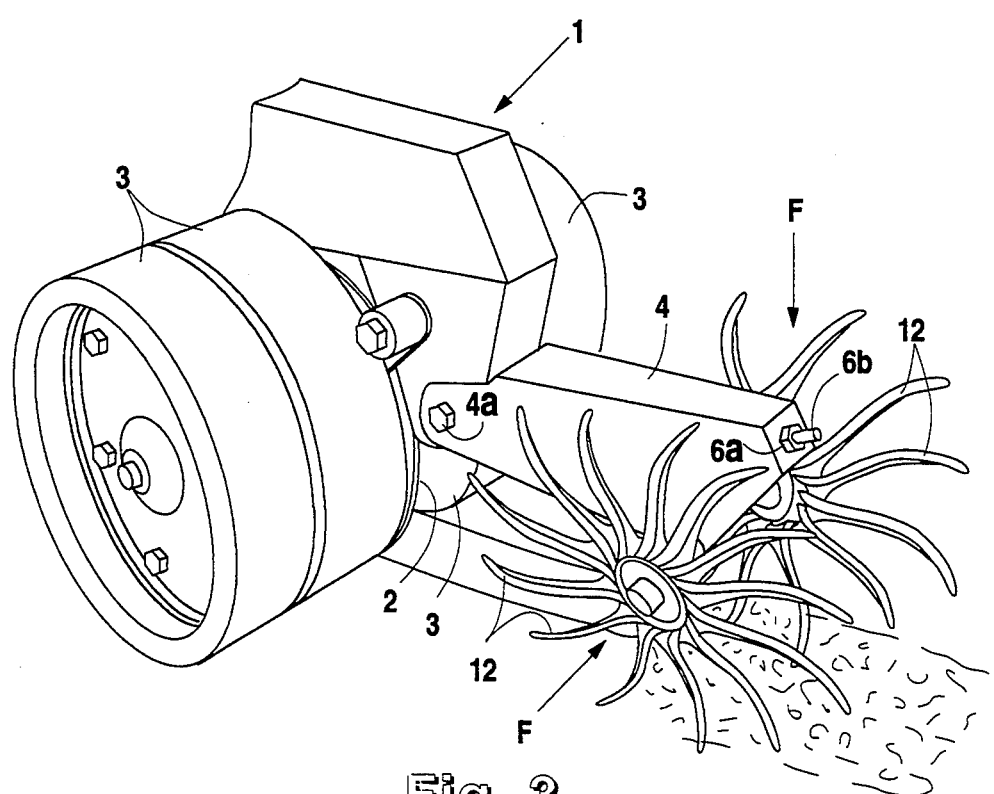
FIG. 3 is a side elevational view of a seed planter incorporating a seed furrow covering apparatus embodying this invention, with gauge wheels removed for clarity of illustration.

Referring to FIGS. 1A and 1B, and 2A and 2B, the difference between Applicant's invention and a popular form of seed trench covering apparatus is schematically illustrated. In FIGS. 1A and 1B, there is shown a pair of conventional discs or coulters C mounted on a planter (not shown) for rotation about two axes that lie in the same vertical plane, but are inclined relative to each other to position the cutting edges of discs C adjacent the sidewalls of an open seed furrow or trench T in which seeds S are deposited at spaced intervals. When operating in soil having a substantial clay content, the discs C slice two strips of soil adjacent the sidewalls of the furrow F and move said sidewalls into firm contact with each other as illustrated in FIG. 1B. The resulting compaction of the clay soil forms an impenetrable soil layer immediately above the seeds, preventing the germinating plant from reaching the surface.

Referring now to FIGS. 2A and 2B, the same seed furrow or trench T is shown with seeds S deposited at spaced intervals. However, the discs C are respectively replaced by rotary forks F embodying this invention. As shown in FIGS. 3–6, each rotary fork F comprises a hub 10 on which are rigidly mounted a plurality of angularly spaced, radially projecting, rigid tines 12. Each tine is radially curved to provide a convex surface 12a which initially contacts the soil surface and leads the tine through the soil, thus providing a compressing action on the soil. The rotary forks are respectively positioned on each side of the seed trench T and thus produce a fragmentation of the sidewalls and adjacent soil, producing soil particles which naturally move into the seed trench T to cover the deposited seed.

Referring now to FIGS. 3–6, the mounting of the rotary forks F on a conventional planter P is schematically illustrated. Planter P has a main frame 1 on which is conventionally mounted in depending relation, a pair of conventional furrow opening discs 2, gauge wheels 3 on each side of the furrow opening discs 2, and a seed depositing tube 5. A conventional seed metering mechanism (not shown) is provided for on frame 1 for each furrow opener for dropping seeds at spaced intervals into the seed furrow or trench produced by furrow opening discs 2.

A subframe 4 is horizontally pivoted to main frame 1 by pivot bolt 4a for pivotal movements in a vertical plane. A tension spring 5 exerts an adjustable downward force on the subframe 4 to control the depth of penetration of the tines 12 of the two rotary forks F. The amount of spring force is adjusted by an adjustable nut 6a cooperating with a threaded spring anchor 6b.

Figure 5:
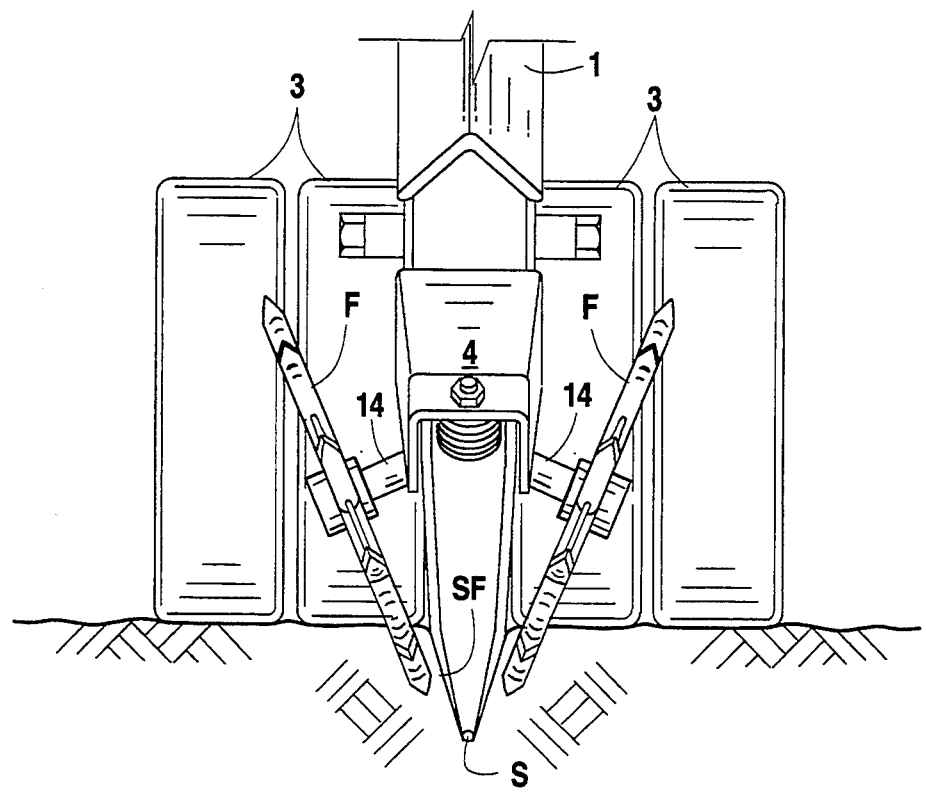
FIG. 5 is a rear elevational view of FIG. 3.
Figure 6:
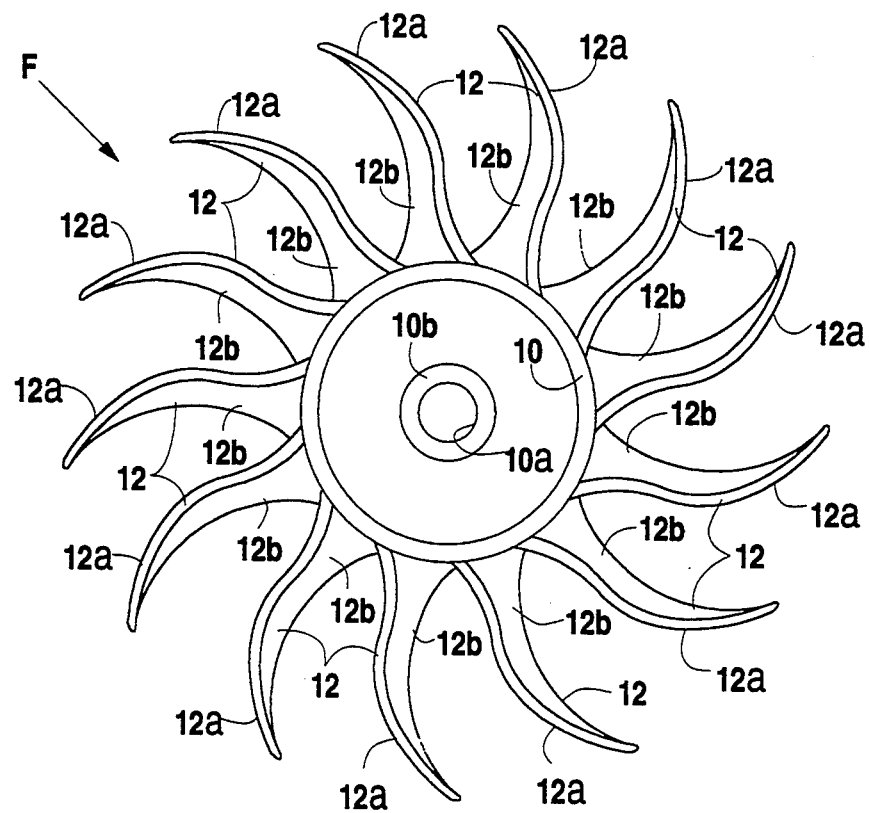
FIG. 6 is an enlarged scale, side elevational view of a rotary fork embodying this invention.

A pair of shafts 14 are mounted on the trailing end portion of the subframe 4 and respectively provide a bearing mounting of the rotary forks F. The hubs 10 have a central bore 10a in which suitable bearings 10b are conventionally mounted to permit free rotation of the two rotary forks about axes which lie in the same vertical plane but are slightly inclined relative to each other, as shown in FIGS. 2A and 5.

The position of subframe frame 4 is adjusted by nut 6a to position the tines 12 of the rotary forks F to engage the soil immediately adjacent to the sidewalls of the seed trench T to a depth approaching the depth of the seed trench T. As previously mentioned, each of the radially projecting rigid tines 12 is radially curved to provide a convex leading surface 12a, substantially flat across its width, which engages and moves through the soil to fragmentize such soil to fill the seed trench T with soil particles. The adjustment of spring 6 to provide the desired depth of penetration of the tines 12, is, of course, determined by the nature of the soil in which the planter is to be operated. Light sandy soils require less spring force than heavy clay soils.

In the preferred construction of the rotary forks embodying this invention the diameter of the rotary forks is approximately 13 inches and the number of tines is 13. The radius of curvature of the convex surfaces of the rotary fork tines is in the range of four to six inches, and more preferably, five inches. The width dimension of the tines in the range of 0.60–0.90 inches and is preferably 0.75 inches.

The advantages of the seed furrow closing apparatus of this invention will be readily apparent to those skilled in the art, particularly when it is desired to plant a field which has not been plowed or disced in advance of planting and is filled with stubble and trash remaining from harvesting the previous crop. When corn stubble is encountered by the tines 12, the tines can readily straddle the particular stubble or slide downwardly adjacent such stubble. Thus, the rotary forks F will generally not be elevated by stubble in the field to produce incomplete seed coverage. If trash, such as a stalk, is engaged by the convex face 12a of any tine 12, it will be discarded by such tine as the convex surface rises from the ground. The effectiveness of this invention in clay soils has already been discussed, but the invention is equally effective in loose sandy soils. Thus, if a particular field contains both types of soil, it is generally not necessary to change the depth of the seed trench covering apparatus. In all soils, the soil in the furrow is left in an aerated condition.

Modifications of the apparatus disclosed herein may be obvious to those skilled in the art of agricultural planters, and it is intended that all such modifications be included within the scope of the appended claims.

What is claimed and desired to be secured by Letters Patent is:

1. In a seed planter having a tractor pulled frame, a seed furrow opener depending from said frame and engagable with the soil to produce a seed furrow having laterally spaced side walls, and means for dropping seed into said open seed furrow at spaced intervals, the improvement comprising:

a subframe extending rearwardly from said frame;

a pair of laterally spaced bearing means on said subframe and spaced rearward of said seed dropping means;

said bearing means having axes oppositely angularly disposed relative to the horizontal;

a pair of rotary forks respectively rotatably mounted by said bearing means and disposed on opposite sides of said open seed furrow;

each of said rotary forks having a hub portion operatively engaged with a respective bearing means and a plurality of radially projecting, peripherally spaced, rigid tines;

said tines constructed and arranged to sequentially penetrate the soil on each side of said open seed furrow by the forward movement of the tractor pulled frame to fragmentize both side walls of the open seed furrow into particles and laterally move soil particles into the open seed furrow to cover the seeds deposited therein.

2. The apparatus of claim 1 wherein each said rotary fork tine is curved to provide a convex soil contacting surface, whereby trash encountered by each tine is discharged from the convex surface of the tine as said tine rotates upwardly out of the soil.

3. The apparatus of claim 2 wherein the diameter of each said rotary fork is approximately thirteen inches and each said rotary fork has thirteen of said tines.

4. The apparatus of claim 2 wherein said convex surface of each said rotary fork tine has a width in the range of 0.5 to 1.0 inches and is essentially flat across said width, thereby producing a compressing action on the soil contacted by said convex surface.

5. The apparatus of claim 4 wherein said convex surface of each said rotary fork tine has a width of 0.75 inches.

6. The apparatus as claimed in claim 2, wherein said rotary forks slightly converge rearwardly toward one another.

* * * * *